Nov. 2, 1954    J. H. BAKER    2,693,397
ROLLER FOR CRAWLER MECHANISMS
Filed June 19, 1952
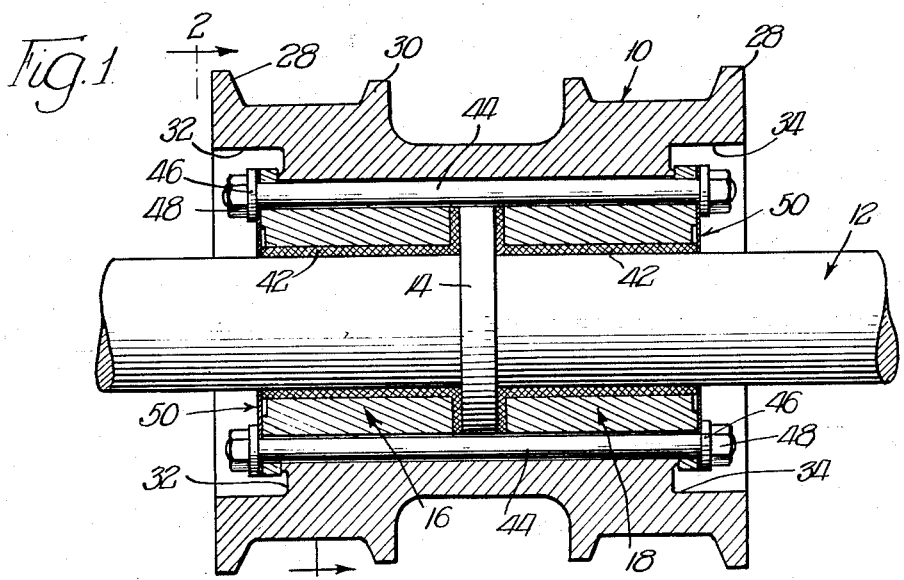
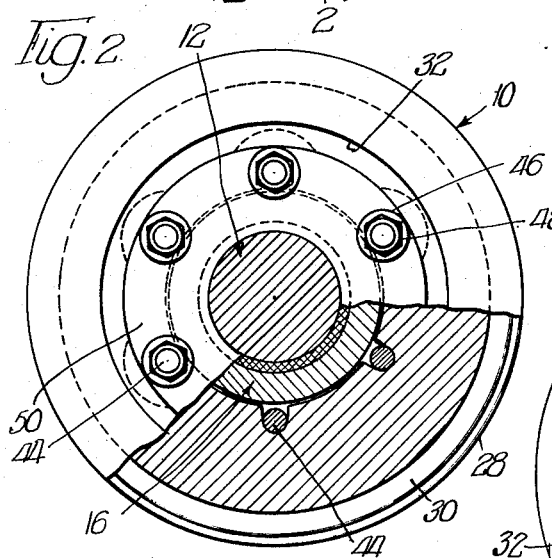
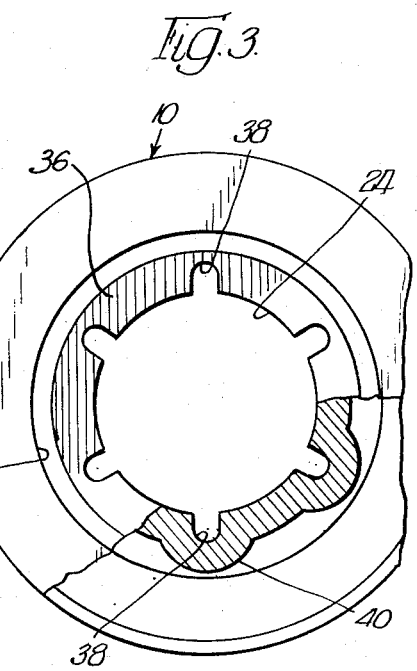
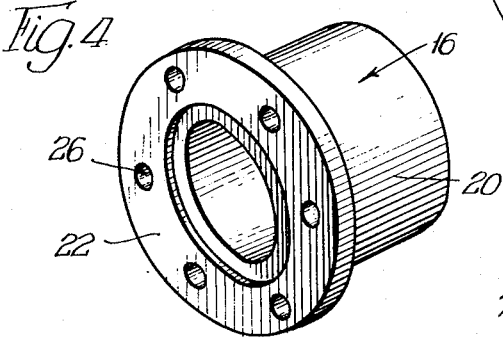
INVENTOR.
BY John H. Baker, United States Patent Office 2,693,397
Patented Nov. 2, 1954

2,693,397

ROLLER FOR CRAWLER MECHANISMS

John H. Baker, Park Forest, Ill., assignor to American Brake Shoe Company, New York, N. Y., a corporation of Delaware Application June 19, 1952, Serial No. 294,497

6 Claims. (Cl. 308—18)

The invention relates to rollers for track laying vehicles such as crawler tractors, the rollers mounting the shoes of the tractor and the shoes in turn supporting the weight of said tractor and providing for its movement. More particularly, the invention relates to bearing structure for journalling the rollers for rotation and has for an object to provide bearing structure incorporating improved features whereby the rollers may be made entirely of manganese steel since the bearing structure can be adapted thereto without the need of inserts of any kind.

When the tractor rollers are made of machinable steel, openings can be drilled or tapped at each end of the roller for receiving cap screws which hold the journalling bushing in place within the roller. However, difficulty is encountered when a roller of manganese steel is substituted for rollers of machinable steel since it is practically impossible to provide tapped openings in the hard manganese steel. As a result it has heretofore been necessary to provide a carbon steel insert when manganese steel rollers are used.

An object of the invention is to provide improved roller structure for crawler tractors and the like which will permit complete interchangeability with rollers heretofore manufactured for the same purpose, wherein the rollers can be made entirely of manganese steel, and wherein carbon steel inserts or similar equipment is completely eliminated.

A more specific object of the invention is to provide roller bearing structure such as described which will employ studs for retaining the journalling bushing within the roller, and wherein the roller is cast with axially extending slots for receiving the studs.

A further object of the invention is to provide a roller for crawler tractors and the like that can be made of manganese steel and which will be characterized by a plurality of axially extending slots spaced around the periphery of the center opening and having communicating relation with said openings.

With these and various other objects in view, the invention may consist of certain novel features of construction and operation as will be more fully described and particularly pointed out in the specification, drawings and claims appended hereto.

In the drawings which illustrate an embodiment of the invention and wherein like reference characters are used to designate like parts—

Figure 1 is a longitudinal sectional view showing a tractor roller and journalling bearings therefor constructed in accordance with the present invention;

Figure 2 is an end elevational view of said roller structure, parts being shown in section, as indicated by line 2—2 of Figure 1;

Figure 3 is an end elevational view, parts being shown in section, of the tractor roller as shown in Figure 1 before insertion of the journalling bearings for said roller; and Figure 4 is a perspective view of a journalling bearing such as may be inserted within the roller of Figure 3.

Referring to the drawings, the embodiment of the invention selected for illustration includes a double flanged roller 10 such as may be used with a crawler tractor of the conventional type for supporting the shoes thereof. The roller additionally provides for bodily movement of the shoes which are articulatedly connected to each other in a manner forming an endless track. The roller is journalled for rotation on a shaft such as 12 which is characterized by the collar 14, the same being integral with the shaft or fixedly secured thereto and essentially consisting of an annular projection having a diameter considerably in excess of that of shaft 12 and having a width which may vary, depending on the size of the roller journalled by the shaft and the strength required of the collar.

The roller is suitably mounted on shaft 12 and journalled thereby so as to have free rotation. For this purpose journalling bushings 16 and 18 are provided, one bushing having location in the left hand end of the roller and the other bushing having location in the right hand end of the roller. Although the bushings are used at respective ends of the rollers they are identical in construction and are accordingly interchangeable. Each bushing is substantially cylindrical in shape and includes the tubular body portion 20 and a facing flange 22 integral therewith. The diameter of the body member 20 of each journalling bushing is just slightly less than the diameter of the center opening 24, which extends through the roller from end to end thereof. As a result the journalling bushing can be freely inserted within the center opening. However, the facing flange 22 of each journalling bushing has a diameter considerably in excess of that of the central opening 24 in order to provide a stop for positioning the journalling bushing within the central opening. The facing flange 22 of each journalling bushing is provided with a plurality of openings 26 which extend through the flange and have utility for receiving securing studs as will be more fully described.

The roller 10 is provided with peripheral flanges 28 at respective ends of the roller and with intermediate flanges 30 on the respective sides of the transverse center. Due to this arrangement of flanges the roller is termed a double flanged roller as distinguished from a single flanged roller wherein the intermediate flanges 30 are eliminated. Each end of the roller is recessed, the recess at the left hand end being indicated by numeral 32 and the recess at the right hand end being indicated by numeral 34, Figure 1. The recessed face of the roller adjacent the central opening is indicated by numeral 36, Figure 3. In accordance with the invention the roller is additionally provided with a plurality of slots indicated by numeral 38 and which extend axially of the roller in a direction parallel to the central opening 24 and in communicating relation with the central opening. The material of the roller is arced circumferentially as at 40 to provide additional metal since otherwise the slots 38 might weaken the roller at their locations. The slots are spaced circumferentially around the central opening 24 and their number and spacing coincides exactly with that of the openings 26 so that when the journalling bushings are inserted within the central opening 24 of the roller the openings 26 can be aligned with the slots 38.

In journalling the roller 10 on the shaft 12 the roller is located on the shaft in telescoping relation therewith, having collar 14 positioned substantially centrally of the roller. The journalling bearings 16 and 18 are then assembled with the roller, being located in opening 24 on respective sides of the collar 14. It is contemplated that each journalling bearing will be equipped with anti-friction lining such as 42 which may comprise brass or similar material. The lining 42 extends circumferentially on the inside of the body portion 20 of each bearing and also covers the end surface of each body portion. As a result the entire surface of each journalling bearing in contact with shaft 12 and also in contact with its collar 14 is provided with the anti-friction material. The journalling bearings are releasably secured to the roller by means of elongated studs 44 which extend through the openings 26 in the facing flange of each journalling bearing. Also the studs have location in slots 38 whereby the bearings are not only effectively secured to the roller but also locked in a manner preventing relative rotation between the parts. As a result the roller, the studs, and the bearings rotate as a unit, being mounted on the shaft for substantially frictionless movement and being held against endwise displacement as a result of collar 14.

At the respective ends of each elongated stud 44 the same receives a lock washer 46 and a securing nut 48.

When the securing nuts 48 are tightened against the lock washers, the bearings are firmly and securely held to the roller. It will be observed that the facing flange 22 of each bearing is in direct contact with the recessed face 36 on its respective side of the roller. To protect the flange 22 of each bearing against damage which may be done thereto by the action of the lock washers a protective washer such as 50 may be employed.

The improvements of the invention make it possible to cast the roller entirely of manganese steel since slots 38 are provided in lieu of the tapped openings heretofore employed. The structure is characterized by the long studs 44 which extend from end to end of the roller and connect the journalling bearing 16 with the bearing 18, the collar having location between the bearings. The studs receive securing nuts such as 48, so that releasability of the roller is provided for in addition to interchangeability with rollers of the conventional type as heretofore manufactured.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:

1. In roller structure for crawler tractors and the like, the combination with a shaft, of a roller journalled for rotation on said shaft, a bearing for journalling the roller comprising a cylindrical member having a facing flange at one end thereof, said facing flange having a plurality of openings therein in spaced relation, said roller having a central opening for receiving the bearing and also having slots extending axially of the roller and communicating with the central opening, said slots being circumferentially spaced to align with the openings in the facing flange, and a stud in each aligned opening and slot for securing the bearing to the roller.

2. In roller structure for crawler tractors and the like, the combination with a shaft, of a roller adapted to be journalled by the shaft, a bearing for journalling the roller comprising a cylindrical member having at one end thereof a laterally projecting facing flange, said roller having a central opening for receiving the bearing, said opening extending axially through the roller and a plurality of circumferentially spaced slots extending axially from end to end of the roller and communicating with the central opening, said facing flange having a plurality of openings equal in number to the slots and spaced so as to align with the slots when the bearing is positioned within the central opening, and a stud in each aligned opening and slot for securing the bearing to the roller.

3. In roller structure for crawler tractors and the like, of a shaft having an integral collar, of a roller adapted to be journalled by the shaft in a manner whereby the collar prevents endwise displacement of the roller, bearings for journaling the roller with a bearing being located on each side of the collar, each bearing comprising a cylindrical body portion having at one end thereof a laterally projecting facing flange, said roller having a central opening for receiving the bearings, said opening extending axially through the roller and said roller having a plurality of circumferentially spaced slots extending axially from end to end of the roller and communicating with the central opening, the facing flange of each bearing having a plurality of openings equal in number to the slots and spaced so as to align with the slots when the bearings are positioned within the central opening, a stud in each slot extending through the aligned opening of each facing flange and projecting beyond the flange at respective ends, and securing nuts threaded to each projecting end of the studs for releasably securing the bearings to the roller.

4. Roller structure for crawler tractors and the like as defined by claim 3, wherein the roller is provided with a recess at each end forming a cavity concentric with the central opening, wherein the facing flanges of the bearings have location in the cavities respectively, and additionally including a liner of antifriction material on those surfaces of each bearing adapted to have contact with the shaft and the collar.

5. In roller structure for crawler tractors and the like, of a shaft having a collar fixed thereto, of a roller adapted to be journalled by the shaft in a manner whereby the collar prevents endwise displacement of the roller, said roller having a central opening extending from end to end and also having a plurality of spaced slots disposed circumferentially of the central opening and communicating therewith, a pair of bearings for journalling the roller, each bearing comprising a cylindrical body portion having at one end thereof a laterally projecting facing flange, the central opening of the roller receiving the body portion of the bearings on respective sides of the collar when the bearings are properly positioned, whereby the facing flange of each bearing is located at its respective end of the roller in contact with its respective end face of the roller, said facing flange having a plurality of openings equal in number to the slots and spaced so as to align with the slots, a stud in each slot extending through the aligned opening of each facing flange and projecting beyond the flange at respective ends, and securing nuts threaded to each projecting end of the studs for releasably securing the bearings to the roller.

6. Roller structure for crawler tractors and the like as defined by claim 5, wherein the roller is provided with a recess at each end forming a cavity concentric with the central opening, wherein the facing flanges of the bearings have location in the cavities respectively, and additionally including a liner of anti-fraction material on those surfaces of each bearing adapted to have contact with the shaft and the collar.

References Cited in the file of this patent

UNITED STATES PATENTS

| Number | Name | Date |
|---|---|---|
| 1,171,347 | Morse | Feb. 8, 1916 |
| 2,294,234 | Johnston et al. | Aug. 25, 1942 |